Feb. 25, 1964  J. K. DOUGLAS  3,122,064
RELIEF VALVE UTILIZING BACK PRESSURE
Filed July 10, 1961  4 Sheets-Sheet 1

JAMES K. DOUGLAS
INVENTOR

ATTORNEY

Feb. 25, 1964   J. K. DOUGLAS   3,122,064
RELIEF VALVE UTILIZING BACK PRESSURE
Filed July 10, 1961   4 Sheets-Sheet 2

JAMES K. DOUGLAS
INVENTOR

T. Lloyd La Fave
ATTORNEY

Feb. 25, 1964

J. K. DOUGLAS 3,122,064

RELIEF VALVE UTILIZING BACK PRESSURE

Filed July 10, 1961

JAMES K. DOUGLAS
INVENTOR

J. Lloyd La Fane
ATTORNEY

Feb. 25, 1964  J. K. DOUGLAS  3,122,064
RELIEF VALVE UTILIZING BACK PRESSURE
Filed July 10, 1961  4 Sheets-Sheet 4
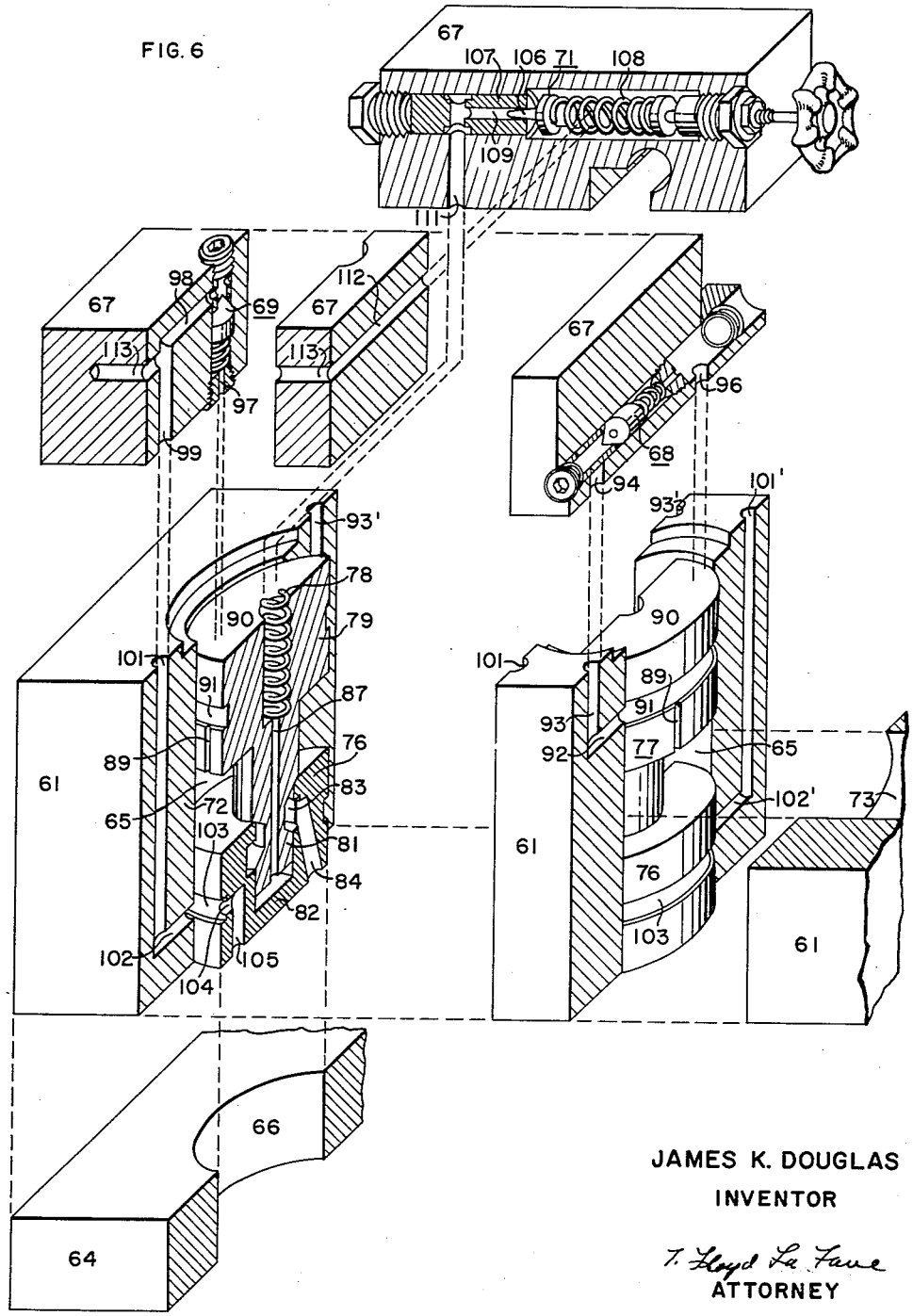
JAMES K. DOUGLAS
INVENTOR
ATTORNEY United States Patent Office 3,122,064
Patented Feb. 25, 1964

3,122,064
RELIEF VALVE UTILIZING BACK PRESSURE
James K. Douglas, Shorewood, Wis., assignor to
The Oilgear Company, Milwaukee, Wis.
Filed July 10, 1961, Ser. No. 123,022
8 Claims. (Cl. 91—437)

This invention relates to a pilot operated pressure relief valve and more particularly to such a valve that utilizes back pressure tending to cause a reverse flow through the valve to hold the valve closed.

A pilot operated pressure relief valve comprises a valve member that normally interrupts communication between an inlet port and an outlet port, being held closed by inlet port pressure admitted to a hold-down chamber, and being opened when a pilot valve connects the hold-down chamber to the outlet port to thereby reduce the hold-down pressure and unbalance the forces on the relief valve member. The relief valve is adapted to be connected across a positive displacement hydraulic device to bypass fluid in one direction through the valve to limit the pressure at one port to a predetermined value. A similar pilot operated pressure relief valve may be oppositely connected across the hydraulic device, to bypass fluid in an opposite direction to limit the pressure at the other port to another predetermined value.

Pressure at an outlet port of relief valves as heretofore constructed tends to stress the valve and cause a leakage flow in a reverse direction through the valve.

According to the present invention pressure at the outlet port is admitted to the hold-down chamber and is thereby utilized to hold the valve closed and to prevent leakage through the valve.

It is an object of the present invention to provide a pilot operated pressure relief valve normally operable to bypass fluid in only one direction through the valve when the inlet pressure exceeds a predetermined value, and that utilizes back pressure on the valve to hold the valve closed.

Another object of the invention is to provide a pilot operated pressure relief valve that applies the back pressure to the hold-down chamber of the valve to hold the valve closed to any value of back pressure, which also renders the pilot valve inoperative.

Another object of the invention is to provide a pair of pilot operated pressure relief valves oppositely connected in parallel with each other and adapted for connection across a positive displacement device, and in which the hold-down chambers of the two relief valves are interconnected so that the inlet pressure of either valve is utilized to hold the other valve closed.

Another object of the invention is to provide a pilot operated relief valve in which pressure at the outlet port is utilized to block reverse flow through the valve.

Other objects and advantages of the present invention will be apparent from a reading of the following description with the accompanying drawings in which:

FIG. 6 is a three dimensional exploded view, partly in section, schematically representing the pilot operated relief valve of FIGS. 2 to 5.

FIGURE I

Figure 1:
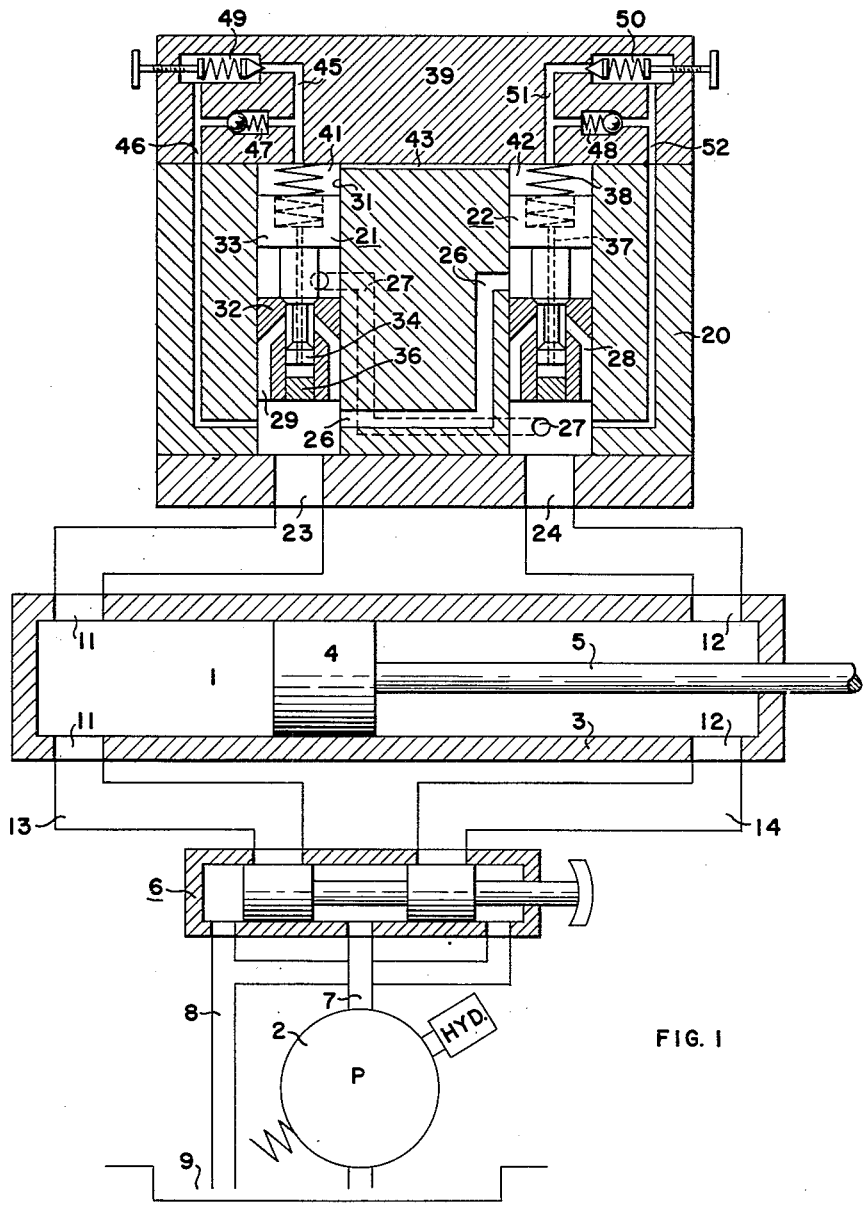
FIG. 1 is a sectional view of a pair of pilot operated relief valves, embodying the present invention, shown schematically in a hydraulic transmission circuit.
Figure 3:
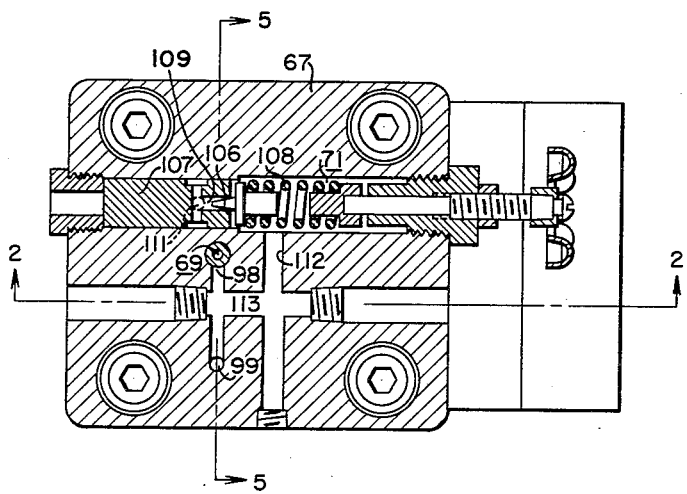
FIG. 3 is a cross sectional view of the valve head of FIG. 2 taken along the line 3—3 thereof.
Figure 2:
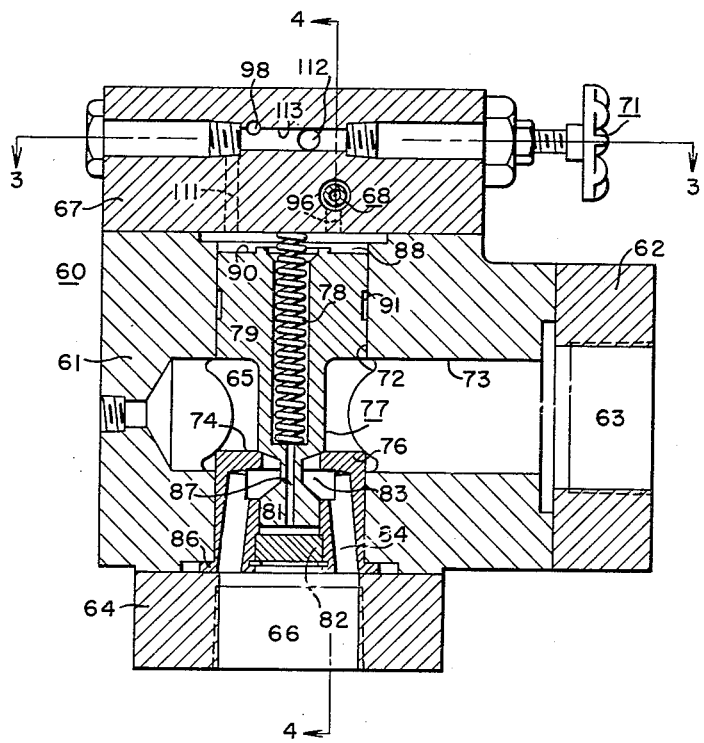
FIG. 2 is a cross sectional view in elevation of a pilot operated relief valve with the relief valve in section through the center thereof and the valve head in section along the line 2—2 of FIG. 3.

A hydraulic transmission embodying the present invention is shown in FIG. 1 and comprises a positive displacement hydraulic motor 1 operatively connected to a source of motive fluid provided by a variable displacement pump 2. The hydraulic motor 1 illustrated in a long cylinder 3 containing a double acting piston 4 having a connection rod 5 adapted to position a load device such as a swing gate of a river lock, not shown, through a suitable rack and pinion linkage to the river gate, not shown.

A manually operable four-way valve 6 selectively connects the supply line 7 from the pump to either port 11 or 12 of the hydraulic motor and connects the other port 11, 12 of the hydraulic motor to the fluid return line 8 to the pump reservoir 9. The four-way valve 6 is also selectively operable to block both lines 13, 14 from the hydraulic motor and to operatively disconnect the pump 2 from the motor 1.

The hydraulic motor linkage to the swing gate, not shown, is protected by valve means comprising a pair of parallel connected and oppositely arranged pilot operated pressure relief valves 21, 22 which shunt the hydraulic motor 1.

One relief valve 21 has its inlet port connected to port 12 of the motor 1 and its outlet port connected to the other port 11 of the motor for bypassing fluid through relief valve 21 when the pressure at motor port 12 exceeds a predetermined value, such as 1000 p.s.i. The other relief valve 22 has its inlet port connected to port 11 of the motor and its outlet port connected to port 12 of the motor for bypassing fluid through the relief valve 22 when the pressure at motor port 11 exceeds a predetermined value such as 700 p.s.i. In order that the function of each relief valve to pass fluid only in one direction at a predetermined value of pressure at its inlet port is not disturbed by the "back pressures" or pressures at the outlet port of the relief valve, these relief valves are constructed and arranged to utilize such "back pressure" to hold the valve closed, as hereinafter described.

Each relief valve 21, 22 comprises a valve chamber formed by a bore 31 in the valve block, in which a sleeve 32 providing a valve seat is secured, and a movable valve member or plunger having a large piston 33 at one end and a small piston 34 at the other end. The large piston 33 is fitted in the valve bore 31 above its inlet passage, and the small piston 34 is fitted in the bore of the sleeve 32. Discharge passages 28, 29 extend through the valve sleeve to connect the bottom end of the valve bore 31 with the discharge chamber formed between the small piston and the valve seat. The bottom end of the sleeve 32 has a plug 36 secured therein so that the sleeve bore forms a cylinder for the small piston 34. A central hole through the valve plunger interconnects opposite ends of the large and small pistons. A spring 38 urges the valve plunger against the valve seat.

A valve head 39 closes the top end of the valve bores 31 to define a hold-down chamber 41 for valve 21 and a hold-down chamber 42 for valve 22. The hold-down chambers 41, 42 are interconnected by narrow grooves 43 in one of the abutting faces of the valve head and valve block which serve to limit the rate of flow of fluid therebetween. Two or three narrow grooves 43 are preferably provided, and each is a 60 degree angle V shaped groove to a depth of .035 inch.

Flow restriction passages provided by the narrow grooves 43, interconnecting the hold-down chambers 41, 42 for the two valves, eliminate the need for separate flow restriction passages for each valve between its hold-down chamber and normal inlet chamber on opposite sides of its control piston, such as restriction passage 89 in the single valve embodiment of FIGS. 2 to 6, hereafter described.

A check valve 47 and a pilot valve 49 are disposed in valve head 39 and connected in parallel with each other between a passage 45 from hold-down chamber 41 and a passage 46 that also extends through the valve block 20 and communicates with port 23. Check valve 47 is a relatively low resistance valve that permits fluid to flow in one direction from line 46 to line 45 and thus to hold-down chamber 41. Pilot valve 49 is preset to open when the pressure in hold-down chamber 41 exceeds a preset value when inlet passage 27 is supplied with pressure fluid from port 24. Similarly, relief valve 22 has associated, therewith, a check valve 48 and a pilot valve 50 disposed in valve head 39 and connected in parallel with each other between a passage 51 from hold-down chamber 42 and a passage 52 that extends through the valve block and communicates with port 24. Check valve 48 is a relatively low resistance valve that permits fluid flow in one direction, from line 52 to line 51 and thus to hold-down chamber 42. Pilot valve 50 is preset to open when the pressure in hold-down chamber 42 exceeds its preset value when inlet passage 26 to relief valve 22 is supplied with pressure fluid from port 23, whereas port 24 is at a relative low pressure such as when connected to the return line to the pump reservoir 9.

The operation when selector valve 6 has its spool element positioned to the left, then the pump discharge line 7 is connected to motor port 11, and return line 8 is connected to motor port 12. Relief valve 22 is operatively connected between ports 23 and 24 to bypass fluid therebetween when the pressure at motor port 11 exceeds the setting of pilot valve 50, for such pressure fluid is admitted by check valve 47 to hold-down chamber 41 and via the restriction slot 43 to hold-down chamber 42. High pressure at port 23 places pressure on both sides of pilot valve 49 and makes it inoperative. Pressure at port 23 acts on the discharge end of valve 21 but is balanced by such pressure being admitted to hold-down chamber 41 and thereby also acting on the end of its large piston 33 to hold the valve 21 closed.

When the spool of the selector valve 6 is positioned to the right, line 14 and port 12 of the motor are connected to the pressure discharge line 7 of the pump, and port 24 is then the high pressure port of valve block 20. Relief valve 21 serves to limit the pressure at motor port 12 to a value determined by the preset value of pilot valve 49. Pressure fluid from port 24 is admitted by check valve 48 to hold-down chamber 42 and therefrom through restriction slot 43 to hold-down chamber 41, whose pressure is then limited by pilot valve 49. Pilot valve 50 is inoperative due to high pressure being on the back side of its pilot piston. Pressure at port 24 is also present in hold-down chamber 42 and thus relief valve 22 is balanced against the forces produced by such "back pressure" at port 24, and its plunger held closed thereby.

It should be noted that the restriction slots 43 being located between the hold-down chambers 41 and 42 are subject to frequent reversal of flow direction therein which is effective in maintaining the restriction slot free of waste material that would otherwise tend to accumulate and block one of the restriction slots. Moreover, locating the restriction slots 43 in an abutting face of the valve block and valve head, they can readily be inspected when the valve head 39 is removed.

FIGURES 2 to 6

In the relief valve protective system illustrated in FIG 1, two separately constructed pilot operated relief valves, each constructed like the relief valve 60 illustrated in FIGS. 2 to 6, may be oppositely connected in parallel across the ports 11, 12 of a hydraulic device such as the hydraulic motor 1 in FIG. 1.

Pilot operated relief valve 60, FIGS. 2 to 6, comprises a valve block 61 having a side head 62 provided with an inlet port 63, an end head 64 provided with an outlet port 66, and a valve head 67 provided with a pair of check valves 68, 69 and a pilot valve 71. The relief valve 60 comprises a plunger receiving bore 72 defining a valve chamber in the valve block separated by the plunger into a hold-down chamber 88, an inlet pressure chamber 65, and a discharge chamber 83. The inlet pressure chamber 65 is connected by a radial bore 73 to inlet port 63.

A sleeve 76 is secured within the valve chamber so that its upper end provides a valve seat 74 for a plunger 77 to interrupt communication between the inlet and outlet ports 63, 66.

The plunger 77 comprises a large piston 79 fitted in the valve chamber above inlet bore 73 and a small piston 81 at its other end fitted in the sleeve 76. A plug 82 is secured in the bottom end of the sleeve 76 so that it forms a cylinder for the small piston 81. The plunger 77 defines an annular discharge chamber 83 between the valve seat 74 and the small piston 81, and discharge chamber 83 is radially enlarged by an annular slot within the sleeve 76 which is connected by a plurality of circumferentially spaced and generally axially extending discharge holes 84 which extend to the bottom of the sleeve and open to outlet port 66. The bottom end of the sleeve is provided with an integral ring flange 86 that abuts the shoulder of the bore 72 in the valve block and the end head 64 to axially secure the sleeve 76 within the valve chamber. The plunger 77 has lift areas provided by the bottom surface of the large piston and the bottom surface of the small piston 81, and the sum of these lift areas is substantially equal to a hold-down area provided by the top area 90 of the large piston 79. The opposite ends of the plunger 77 are interconnected by a central passage 87 extending through the plunger.

A hold-down pressure chamber 88 is defined in the end of the valve chamber by the valve head 67 and the large piston 79, and fluid under pressure therein urges the piston 79 toward the valve seat, and fluid therein is also admitted by passage 87 to the cylinder provided for the small piston 81 to urge the small piston upward in opposition to the hold-down pressure on the large piston.

The inlet port 63 is operatively connected to the hold-down chamber 88 by narrow axial slots 89 in the surface of the large piston 79 and by a horizontally disposed check valve 68 which allows fluid to flow only in a direction through the valve toward the hold-down chamber 88.

The slots 89 are preferably four separate 60 degree angle V shaped slot each having a depth of .035 inch. The narrow slots 89 restrict the flow therethrough and thereby limit the rate of increase of pressure in the hold-down chamber 88. The restriction slots 89 connect an annular groove 91, disposed in the surface of large piston 79, with the inlet chamber 65. A radial hole 92 in the valve block 61 communicates with the annular groove 91 in the large piston and with an axial hole 93 in the block that aligns with a hole 94 in the valve head that serves as the inlet to the check valve 68. Check valve 68 is connected by a vertical discharge hole 96 that is open to hold-down chamber 88.

The outlet port 66 is operatively connected to the hold-down chamber 88 by check valve 69 which allows fluid to flow in one direction therethrough toward hold-down chamber 88. Check valve 69 is arranged vertically within valve head 67 above hold-down chamber 88 and with a discharge passage 97 open to the hold-down chamber. The valve head 67 has a horizontal passage 98 that serves as the inlet to check valve 69 and which connects with a vertical passage 99. Vertical passage 99 in the valve head aligns with vertical passage 101 in the valve block 61 that connects with a radial passage 102, extending from the valve bore 72, in communication with an annular groove 103 in the outer periphery of the sleeve 76. The annular groove 103 is connected by a plurality of radial holes 104, FIG. 6, or directly, FIG. 5, to axial extending holes 105 and thereby to the bottom of the sleeve 76 for communication with the outlet port 66.

The pilot valve 71 operatively connects the hold-down chamber 88 with the outlet port 66. The pilot valve is conventionally constructed, having a pilot piston 106 held against its seat by a spring 108 whose compression may be adjustably preset. The plug 107 forming the pilot valve seat 107 has a central bore 109 that connects with a vertical hole 111 serving as an inlet passage to the pilot valve which is open to the hold-down chamber 88. The discharge side of the pilot valve 71 is connected by a horizontal hole 112 that extends forward through the valve head 67 and joins a laterally extending horizontal hole 113 which in turn joins forwardly extending horizontal hole 98 that serves as the inlet to check valve 69. Thus by way of hole 98 and vertical hole 99 the discharge of pilot valve 71 uses the same passages to the outlet port 66 that serves to connect the inlet of check valve 69.

Figure 5:
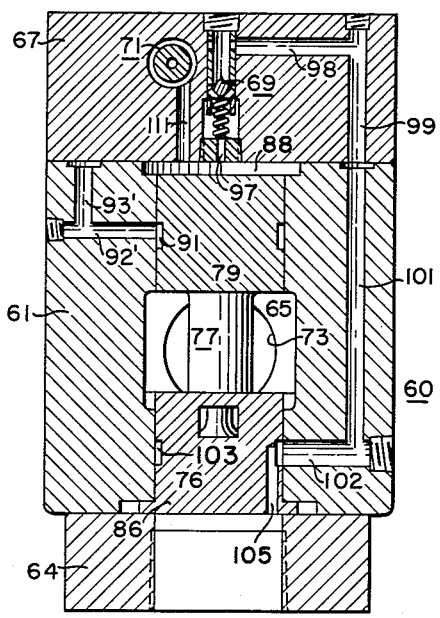
FIG. 5 is a sectional view in elevation taken along the line 5—5 of FIG. 3.
Figure 4:
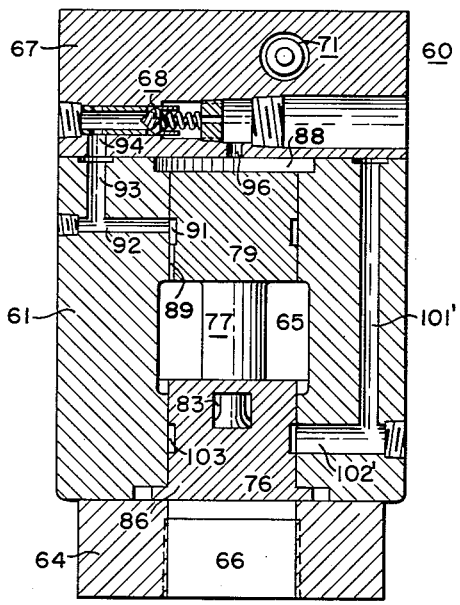
FIG. 4 is a sectional view in elevation taken along the line 4—4 of FIG. 3.

The valve head described may be rotated 180 degrees on the head of the valve block and about the axes of the relief valve 60 and still maintain the valves in the valve head 67 operatively connected to the hold-down chamber 88 as before rotation. For this purpose the valve block 61, FIGS. 4 and 5, is provided with additional vertical passages 93' and 101' for alignment with vertical passages 94 and 99, respectively, in the valve head in its reversely disposed position. It should be noted that passages 101', 102' are symmetrically arranged in the valve block relative to passages 101, 102 and the axis of the relief valve; and that similarly passages 93', 92' are symmetrically arranged relative to passages 93, 92.

In normal operation, inlet pressure at port 63 is to be limited to a predetermined value, and such inlet pressure is admitted to the hold-down chamber 88 by way of the flow restricting slot 89 and the check valve 68. When the inlet pressure exceeds the setting of the pilot valve 71, the pilot valve opens to discharge fluid from the hold-down chamber 88 to the outlet port 66, and thereby results in pressure at the inlet chamber 65 causing the relief valve to open to limit the pressure at the inlet port 63.

High pressure at the outlet port 66 may be limited by the pressure setting of another oppositely connected pilot operated relief valve. To protect the relief valve when high pressure exists at the outlet port 66 and to avoid leakage and reverse flow through the valve as a result thereof, the pressure at the outlet port is conducted by way of the low resistance check valve 69 to the hold-down chamber 88 to thereby act on the hold-down area 90 of the large piston 79 to hold the valve closed. The pressure at the outlet port 66 also is conducted by way of valve head passages 99, 113, and 112 to the discharge side of the pilot valve 71 to thereby render it inoperative and non-responsive to "back pressure" in the hold-down chamber 88.

While but two embodiments of the present invention have been illustrated, other embodiments and modifications can be made within the spirit of the invention and the scope of the appended claims.

I claim:

1. A pilot operated pressure relief valve comprising a main valve urged by a spring into abutment with a valve seat to interrupt communication between an inlet port and an outlet port, a hold-down chamber adjacent an end of said valve; a pilot valve having an inlet passage connected to said hold-down chamber and a discharge passage connected to said outlet port, and a pilot piston biased to close communication between said inlet passage and said discharge passage and normally operable to establish communication therebetween when the pressure in said hold-down chamber exceeds a predetermined value; said relief valve characterized by a first means connecting said inlet port to said hold-down chamber for a unidirectional flow from the inlet port to the hold-down chamber and for a limited rate of flow therebetween, and a second means connecting said outlet port to said hold-down chamber for a unidirectional flow from the outlet port to the hold-down chamber, whereby pressure in the outlet port of the relief valve is utilized to hold the valve closed.

2. The pilot operated relief of claim 1 connected across a positive displacement hydraulic motor of a hydraulic transmission whose lines when closed leave said relief valve and said hydraulic motor in a closed loop circuit, said hydraulic motor being subject to load forces that cause said hydraulic motor to transmit pressure to the outlet port of the relief valve, and said relief valve applying said pressure at the outlet port to the hold-down chamber of the valve to urge the main valve closed to prevent reverse flow through the relief valve.

3. A pilot operated pressure relief valve comprising a main valve urged by a spring into abutment with a valve seat to close communication between an inlet port and an outlet port, a hold-down chamber at one end of said valve, a passage means limiting the rate of fluid flow therethrough and a check valve in series therewith connecting said inlet port to said hold-down chamber for a limited rate of flow from said inlet port to said hold-down chamber, a pilot valve having an inlet passage connected to said hold-down chamber and an outlet passage connected to said outlet port and a pilot piston urged by a spring to close communication between said inlet and outlet passages of said pilot valve so that said pilot valve is normally operable to reduce the pressure in said hold-down chamber when the pressure at said inlet port exceeds a predetermined value, and a check valve connecting said outlet port to said hold-down chamber for unidirectional flow therethrough from said outlet port to said hold-down chamber so that fluid pressure at said outlet port is transmitted to said hold-down chamber when such outlet port pressure exceeds the fluid pressure at said inlet port.

4. A pilot operated relief valve comprising a valve chamber, inlet and outlet ports open to said valve chamber, a valve member comprising a piston fitted in said valve chamber and normally urged to a position for closing communication between said ports, an end of said valve chamber defining a hold-down chamber in which fluid under pressure acts on an end of said piston for maintaining said relief valve closed, a flow limiting passage and a first check valve operatively connecting said hold-down chamber to receive pressure fluid from said inlet port, a pilot valve operable to connect said hold-down chamber to said outlet port when the pressure in said hold-down chamber exceeds a predetermined value, and a second check valve operatively connecting said hold-down chamber to said outlet port when the pressure in said outlet port exceeds the pressure in said hold-down chamber so that such pressure in said outlet port acts on said piston to hold said valve closed.

5. A pilot operated relief valve comprising a pressure relief valve having an inlet port, an outlet port, a valve member comprising a plunger and a piston, means normally urging said valve member to closed position wherein said plunger interrupts communication between said inlet and outlet ports, said piston having a lift area adjacent said plunger subject to the pressure of fluid at said inlet port and having an end area in a hold-down chamber subject to the pressure of fluid therein for holding said valve closed, flow limiting means normally connecting said inlet port to said hold-down chamber, a pilot valve operatively connecting said hold-down chamber to said outlet port when the pressure in said hold-down chamber exceeds a predetermined value; in combination with a first unidirectional valve connected in series with said flow limiting means to permit flow only from said inlet port to said hold-down chamber, and a second unidirectional valve operatively connecting said hold-down chamber to said outlet port for flow only from said outlet port to said hold-down chamber for holding said valve closed when the pressure at said outlet port exceeds the pressure at said inlet port.

6. A pilot operated pressure relief valve comprising a valve chamber having inlet and outlet ports, a valve member in said valve chamber and normally urged to a position for closing communication between said ports, an end of said valve chamber defining a hold-down chamber in which fluid from said inlet port is admitted through a flow limiting means, said valve member including a differential area control piston having an end area subject to the pressure of fluid in said hold-down chamber and an opposite area subject to the pressure of the fluid at said inlet port, a pilot valve operative to connect said hold-down chamber to said outlet port when the pressure in said hold-down chamber exceeds a predetermined value when the pressure at the inlet port is greater than the pressure at the outlet port, and unidirectional means operatively connecting said outlet port to said hold-down chamber when the pressure at the outlet port exceeds the pressure at the inlet port.

7. In combination, a pair of pilot operated relief valves having inlet and outlet ports with the relief valves oppositely connected so that the inlet port of each is connected to the outlet port of the other, each relief valve having a hold-down chamber whose pressure is normally limited by a pilot valve which operatively connects the hold-down chamber for discharge to the outlet port of its said valve, each relief valve having a check valve in shunt with the pilot valve to conduct pressure fluid to the hold-down chamber when the pressure at the outlet port of its said valve is greater than the pressure in the hold-down chamber thereof; and flow limiting means interconnecting the hold-down chambers; whereby both of said hold-down chambers receive pressure fluid from the one of said ports having fluid under higher pressure than the other.

8. In combination, a pair of pilot operated pressure relief valves adapted for connection in an opposite sense across the lines of a hydraulic transmission; each of said relief valves including a valve chamber having inlet and outlet ports adapted for connection to said lines, a piston fitted in said valve chamber and normally urged to a position for closing communication between said ports, an end of said valve chamber defining a hold-down chamber in which fluid under pressure acts on an end of said piston for maintaining the valve closed; said pair of valves each having its said inlet port connected to the said outlet port of the other valve, and unidirectional valves connected, respectively, between each of the interconnected said valve ports and the hold-down chambers so as to admit pressure fluid to the hold-down chambers from the one of said lines having a higher pressure than exists in the other of said lines.

References Cited in the file of this patent

UNITED STATES PATENTS

| | | |
|---|---|---|
| 2,044,777 | Erling | June 23, 1936 |
| 2,150,266 | Cotner | Mar. 14, 1939 |
| 2,360,816 | Pasco | Oct. 17, 1944 |
| 2,954,011 | Krehbiel | Sept. 27, 1960 |